3,586,476
METHOD OF STRIPPING IONS FROM AN ION-EXCHANGE LIQUID
Heinz P. Beutner, Lexington, and Paul A. Huska, Carlisle, Mass., assignors to Arthur D. Little Inc., Cambridge, Mass.
Filed Oct. 16, 1968, Ser. No. 768,033
Int. Cl. C01f 7/66
U.S. Cl. 23—102        6 Claims

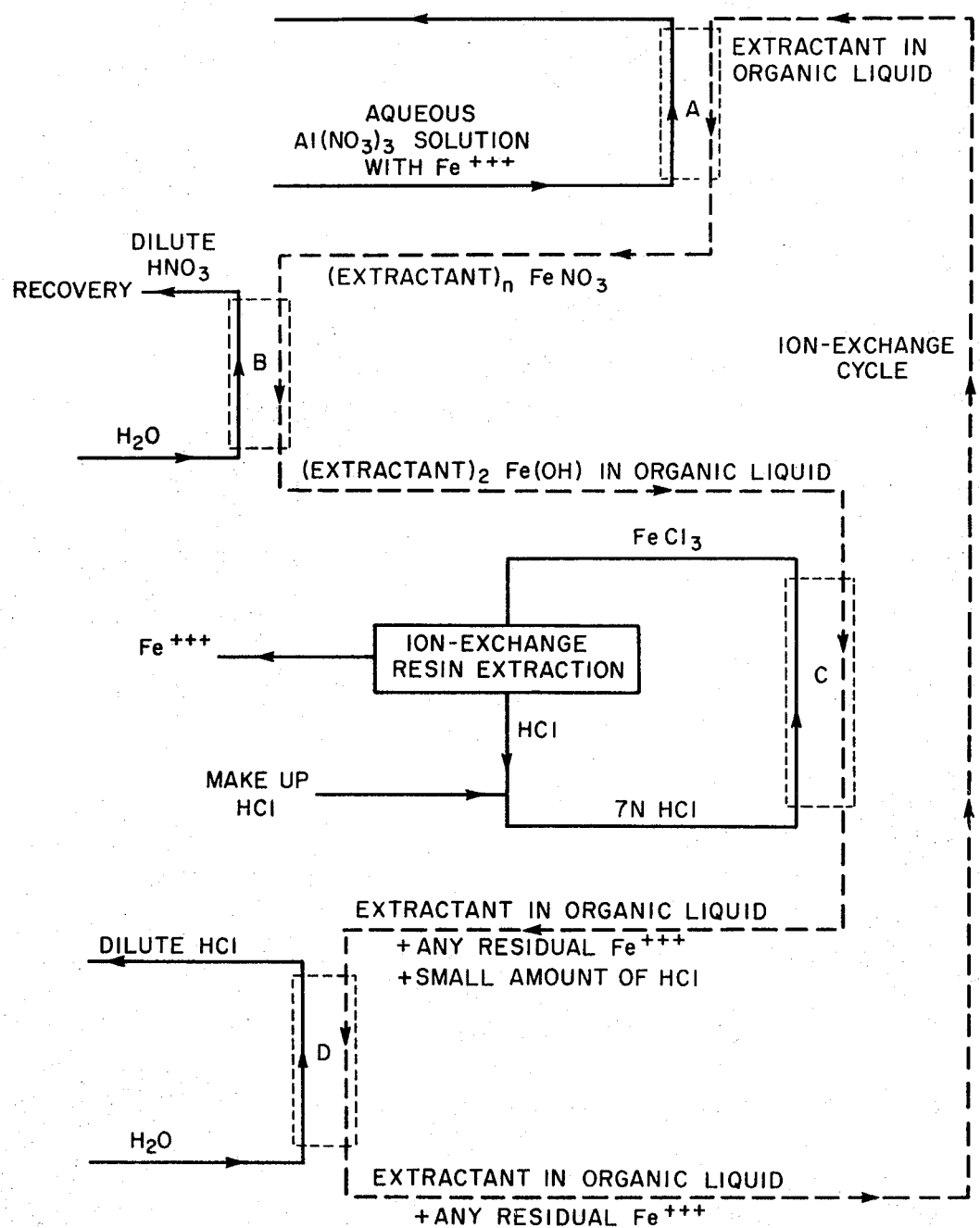

ABSTRACT OF THE DISCLOSURE

An improved method for stripping ferric ions from an organic ion-exchange liquid with an acid characterized by the steps of washing the ion-exchange liquid with water prior to and subsequent to the stripping to prevent the transport of unwanted anions between the aqueous liquid streams.

---

This invention relates to a method for stripping ions from an ion-exchange liquid and more particularly to stripping ferric ions from a cationic exchange liquid.

In the extraction of aluminum from clay it is customary to leach the calcined clay using a strong mineral acid, typically nitric acid. After the undissolved residual material has been filtered from the acid solution there remains a small but intolerable concentration of ferric ions which must be removed essentially quantitatively before the aluminum nitrate can be converted to the oxide. One of the most effective ways of removing this iron is to scrub the aqueous acid solution with an organic ion-exchange liquid containing a complexing agent for the ferric iron to transfer the iron from the aqueous to the organic phase.

It is, of course, highly desirable to be able to recycle the ion-exchange liquid after the iron has been stripped from it. This invention is directed to an improved method for effecting this stripping in such a way as to prevent the accumulation of unwanted reaction products in either the ion-exchange liquid or in the aluminum nitrate solution from which the ferric iron is originally removed.

In U.S. Pat. 3,211,521 there is described a method for stripping iron from an iron-loaded organic ion-exchange liquid such as disclosed in U.S. Pat. 3,211,524. The method of U.S. Pat. 3,211,521 comprises the contacting of the iron-loaded organic liquid with either an acid, a base or a chelating agent. Of these extractants, a strong acid, and more particularly HCl, has been found to be preferable.

It has now been found that the above described liquid ion-exchange process has certain undesirable features, which restrict its practical usefulness, particularly for large-scale, continuous operation. During the loading of the ion-exchange liquid with ferric ions from the aqueous leach liquor which contains aluminum nitrate and small amounts of ferric ions, an appreciable quantity of nitrate ions is transferred to the organic phase as well. These nitrate ions along with the ferric ions are stripped from the organic phase by the aqueous hydrochloric acid. This transfer of nitrate from the leach liquor to the stripping acid represents an undesirable loss of nitric acid. It also increases the corrosiveness of the stripping acid by causing the formation of NOCl and $Cl_2$ under certain conditions.

In addition, it has been found that the recycled ion-exchange liquid can contain chloride ions which are transferred into the organic phase from the hydrochloric acid stripping solution. The amount of chloride present increases both with the concentration of free acid in the stripping solution and with the amount of residual iron in the organic phase after stripping. Since it is both impractical and uneconomic to use low acid concentrations in the stripping solution and to completely remove all iron from the organic phase before recycling, it becomes unavoidable in practice to transport chloride ions back into the aluminum nitrate liquor. This chloride is essentially completely transferred into the aluminum nitrate liquor during the scrubbing operation and causes a very undesirable contamination of the aluminum nitrate liquor. The chloride thus introduced into the liquor remains essentially in the circulating nitric acid of the process, eventually causing serious corrosion problems and loss of nitric acid as NOCl. Some chloride can also remain in the final alumina product even after calcining and give rise to a product which does not meet the specifications for $\alpha$-alumina suitable for electrolytic reduction to aluminum metal.

It is therefore a primary object of this invention to provide a method of stripping cations from an organic ion-exchange liquid without introducing any unwanted anions into either the stripping liquid or into the inorganic phase from which the ions were originally removed. It is another object of this invention to provide a method for stripping ferric ions from an organic ion-exchange liquid using an acid stripping agent. It is yet another object of this invention to provide a method of the character described which does not permit the build-up of unwanted reaction products in either the stripping liquid or in the ion-exchange liquid, or the introduction of impurities into the aqueous phase from which the iron was originally removed.

Another primary object of this invention is to prevent the loss of acid values from either the aqueous solution from which the iron was removed or from the stripping solution. Still another object of this invention is to provide an improved method of stripping ferric ion from an ion-exchange liquid which has in turn been used to remove the iron from an aluminum nitrate solution, the stripping being such as to make the ion-exchange liquid suitable for recycling in contact with additional aluminum nitrate solution. Other objects of the invention will in part be obvious and will in part be apparent hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the single drawing representing a diagrammatic flow chart showing the various steps of the method of this invention.

For convenience of presentation, the method of this invention will be described using an aqueous solution of aluminum nitrate containing small quantities of ferric iron which must be removed; an organic ion-exchange liquid comprising kerosene, di(2-ethylhexyl) hydrogen phosphate and tributyl phosphate as the ion-exchange liquid; and 7 N HCl as the stripping liquid. It will, of course, be recognized by those skilled in the art that the aluminum may be in solution in sulfuric or hydrochloric acid, that the ion-exchange liquid may contain other than a mixture of di(2-ethylhexyl) hydrogen phosphate and tributyl phosphate (see for example U.S. Pat. 3,211,521) and that the stripping liquid may be $HNO_3$ or $H_3PO_4$. In general, the extractant in the ion-exchange liquid may be an alkyl-substituted phosphoric acid having the formula $HRR'PO_4$ wherein R is alkyl containing at least 8 carbon atoms and R' is hydrogen or alkyl. This extractant may be further characterized as being essentially insoluble in the aqueous phase, capable of complexing with ferric ions in the acid solution and essentially noncomplexing with aluminum.

When ferric iron is scrubbed from aqueous aluminum nitrate by complexing the iron with the di(2-ethylhexyl) hydrogen phosphate, which is carried in an organic liquid to transfer the iron to the organic phase, a small amount of nitrate is likewise transferred. Upon stripping the iron-loaded organic phase with HCl the nitrate is transferred into the acid along with the iron; but any residual iron remaining in the organic phase will pick up a certain amount of chloride ion from the aqueous acid. If not removed, this chloride in turn is transferred into the aluminum nitrate solution during recycling. The experimental data reported below show that the quantity of anions thus transported by the organic ion-exchange liquid is dependent on the quantity of iron present in the organic phase and that these anions must therefore be associated with this iron in the organic phase. A similar association of anions with iron has been reported in the literature (see C. F. Baes, Jr. and H. T. Baker, J. Phys. Chem. 64, 89 (1960)) for ferric complexes of di(2-ethylhexyl) hydrogen phosphate in equilibrium with aqueous ferric perchlorate solutions. These authors identified specific compounds of the following compositions, wherein X represents the di(2-ethylhexyl) phosphate ion:

$FeX_3 \cdot 3HX$ at low iron loading

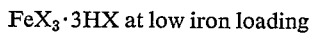

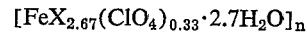 at higher iron loading

The data obtained for the system under consideration indicate a ratio of about 0.15 mole nitrate per mole iron in the iron-saturated organic phase in equilibrium with an aluminum nitrate liquor containing about 46 grams aluminum per liter and approximately 1 molar nitric acid in excess over the stoichiometrically required amounts for the aluminum and iron nitrates. Similarly, chloride is found in the organic phase after stripping with hydrochloric acid, the amount being dependent on the iron concentration remaining in the organic phase. The mole ratio of chloride to iron in the stripping acid increases with the molarity of the stripping acid. Thus the mole ratio of chloride to iron has been found to be 0.2 for a 4.0 molar stripping acid, 0.3 for 5.0 molar, 0.7 for 5.9 molar and more than 1.5 for an 8.0 molar hydrochloric acid. Thus the amount of chloride which can be transported from the stripping acid to the aluminum nitrate liquor can be sufficiently large to cause an intolerable level of chloride contamination in the aluminum liquor unless the iron remaining in the organic phase after stripping is kept at a very low level.

By the method of this invention the transport of anions along with iron in the organic ion-exchange liquid is prevented by exchanging these anions for hydroxyl ions in a washing stage subsequent to each contacting with aqueous liquors containing such undesirable anions. By equilibrating the organic phase with water or dilute acids it is possible to hydrolyze the anion associated with the iron complex in the organic phase and cause an exchange of this anion with hydroxyl ions from the aqueous phase.

The method of this invention may best be detailed with reference to the drawing wherein the heavy dashed line is used to trace the circulation of the organic ion-exchange liquid, comprising an extractant or iron-complexing agent in a water immiscible organic liquid carrier. A preferred ion-exchange liquid is described in a copending application Ser. No. 768,180 filed in the name of Harold W. Flood and assigned to the same assignee as this application.

In the drawing the liquid-liquid contacting steps are designated A–D. The first of these is the contacting of the ion-exchange liquid with the aluminum nitrate solution containing the $Fe^{+++}$ ions to be removed. In this step the ferric iron is transferred from the aqueous phase to the organic phase as the iron is complexed with the extractant, e.g., a mixture of di(2-ethylhexyl) hydrogen phosphate and tributyl phosphate. A small, but intolerable, amount of nitrate is also transferred to the organic phase. This nitrate is removed by washing the iron-containing organic phase with water in contacting step B.

This step, as shown in the drawing, exchanges the $NO_3^-$ for $OH^-$ so that the organic ion-exchange liquid contains $(FeOH)^{2+}$ complexed with the extractant. The dilute $HNO_3$ formed may be recovered if desired.

The iron-containing, nitrate-free ion-exchange liquid must then be stripped of its ferric iron and this is done by countercurrent liquid-liquid contact with HCl in contacting step C. The ferric iron reacts to form $FeCl_3$ which in turn is passed into an ion-exchange resin extraction column in accordance with well-known procedures to recover HCl for recycling. It is usually preferable to limit the number of liquid-liquid contacts in stripping which means that a small amount of residual ferric iron remains complexed with the extractant. This introduces no difficulties since this iron is not redissolved in the aluminum nitrate.

A small, but undesirable amount of chloride ions is retained by the ion-exchange liquid subsequent to the iron stripping and this is removed by washing with water in contacting step D. Again, it is possible to exchange the unwanted $Cl^-$ for an $OH^-$ and to recover dilute HCl if desired. The chloride-free ion-exchange liquid which results from contacting step D is suitable for recycling to remove an additional quantity of ferric iron from an aluminum nitrate solution.

The liquid-liquid contacting steps A–D may be performed in any suitable solvent-extraction equipment such as a counter-current scrubbing tower, a continuous centrifugal extractor, a spray column, an RDX column or the like. Although each contacting step may be repeated as many times as desired, it will normally be preferable in large-scale operations to use the most efficient equipment and perform each liquid-liquid contact step only once.

This invention may be further described in the following examples which are meant to be illustrative and not limiting.

A 1 molar solution of di(2-ethylhexyl) hydrogen phosphate in kerosene was contacted in several phase ratios with an aluminum nitrate solution containing 46 grams aluminum per liter and 2.8 grams iron per liter to achieve contacting step A. The liquor was about 1 molar in nitric acid in excess over the stoichiometrically required acid for the aluminum and iron. The equilibrated organic phase was analyzed for iron and then contacted with water (contacting step B) in a phase ratio of organic to aqueous of 1 to 2. The nitric acid in this aqueous phase after equilibration was determined by acid-base titration. The contacting was repeated 3 times with fresh water to achieve a complete extraction. The results are summarized in Table 1.

It will be seen from Table 1 that as the organic phase (kerosene plus iron-complexing agent) picks up ferric iron, it also picks up nitrate which is reflected in the quantity of nitrate extracted by the water washing of the iron-loaded organic phase. A major portion of this nitrate is extracted from the organic phase in the first washing step. Moreover the data show that when the organic phase is saturated with iron (about 0.37 mole/liter iron for 1.0 mole/liter (di(2-ethylhexyl) hydrogen phosphate in kerosene) the nitrate in the organic phase levels off to about 0.055 mole/liter (mole ratio of nitrate to iron about 0.15) based on the total nitric acid extracted with water in three extraction steps.

TABLE 1.—EQUILIBRIUM DATA FOR CONTACTING STEPS A AND B OF FIG. 1

| Phase ratio, aqueous to organic | Contacting Step A, iron extraction from aqueous nitrate solution, iron concentration (g./l.) | | Contacting Step B, nitrate extraction from iron-loaded organic phase,[1] nitrate in water (mole/l.) | | | Composition of organic phase before washing | | |
|---|---|---|---|---|---|---|---|---|
| | Aqueous | Organic | First stage | Second stage | Third stage | Nitrate (mole/l.)[2] | Iron (mole/l.) | Mole ratio, nitrate to iron |
| 1 | 0 | 2.8 | 0.043 | 0.006 | 0.006 | 0.027 | 0.050 | 0.54 |
| 3 | 0.01 | 8.4 | 0.060 | 0.004 | 0.004 | 0.034 | 0.150 | 0.23 |
| 10 | 0.75 | 20.5 | 0.085 | 0.018 | 0.011 | 0.055 | 0.368 | 0.15 |
| 15 | 1.39 | 21.2 | 0.075 | 0.020 | 0.015 | 0.055 | 0.381 | 0.14 |
| 20 | 1.81 | 19.8 | 0.080 | 0.020 | 0.014 | 0.055 | 0.355 | 0.16 |
| 25 | 1.98 | 20.6 | 0.058 | 0.023 | 0.018 | 0.049 | 0.369 | 0.13 |
| 30 | 2.18 | 18.5 | 0.081 | 0.023 | 0.023 | 0.056 | 0.331 | 0.17 |

[1] Aqueous phase to organic phase ratio of 2 to 1.
[2] Calculated from total nitrate extracted in the three extraction stages.

In the contacting step B in which the nitrate is removed from the organic ion-exchange liquid, the volume ratio of water to organic phase liquid may range from about 1-to-100 to about 10-to-1. It is, of course, normally desirable to use the lowest ratio compatible with the attainment of the desired level of nitrate removal. Generally, the contacting of water with the iron-loaded ion-exchange liquid will be carried out while the ion-exchange liquid is at somewhat above room temperature, first, because the hydrolysis generally increases with increasing temperature; and, second, because it is usually preferable to perform the transfer of the iron ions from the aqueous aluminum nitrate solution to the ion-exchange liquid (contacting step A) at temperatures up to about 60° C. and to perform the nitrate removal step directly thereafter. The water used in contacting step B to remove the nitrate should generally be between about 5° C. and 60° C. The temperature, however, should not be considered as limited to this range. It is conceivable that under certain conditions the use of steam of 100° C. and above may be desirable for hydrolyzing the iron complex in the organic phase in contact with an aqueous condensate of temperatures between 60 and 100° C.

To simulate contacting step C an organic phase consisting of a 1 molar solution of di(2-ethylhexyl) hydrogen phosphate in kerosene was equilibrated in a phase ratio of 1-to-1 with aqueous solutions of ferric chloride of various iron concentrations. The organic phase was analyzed for iron and subsequently contacted with water as in contacting step D in a phase ratio of 1-to-1 in order to remove chloride from the loaded organic phase. Repeated contacting with water showed that generally on the order of 99% of the chloride was removed in the first contacting stage. Data on the extent of chloride pick-up in the organic phase as a function of iron concentration in the organic phase are given in Table 2 for a total chloride concentration of 5.9 molar in the aqueous phase (5.9 N HCl stripping acid).

TABLE 2.—EQUILIBRIUM DATA FOR CONTACTING STEPS C AND D IN FIG. 1

| Iron equilibrium, g./l. in— | | Chloride found in wash water (mole/l.) | Composition of organic phase before washing | | |
|---|---|---|---|---|---|
| Aqueous HCl | Organic ion-exchange liquid | | Iron (mole/l.) | Mole ratio, Cl-/Fe+3 | |
| 4.35 | 1.22 | 0.015 | 0.022 | 0.683 | |
| 7.75 | 2.1 | 0.026 | 0.038 | 0.685 | |
| 11.8 | 2.9 | 0.038 | 0.052 | 0.731 | |
| 18.8 | 5.3 | 0.061 | 0.095 | 0.644 | |
| 27 | 7.5 | 0.085 | 0.134 | 0.634 | |
| 35.8 | 10.5 | 0.131 | 0.188 | 0.697 | |
| 45.5 | 12.4 | 0.168 | 0.222 | 0.793 | |
| 53.0 | 14.5 | 0.208 | 0.260 | 0.800 | |

From the data obtained, Table 2 being illustrative, it is apparent that the chloride concentration in the organic phase increases proportionally with the iron concentration. For the conditions of a 5.9 molar stripping acid the mole ratio of chloride to iron in the organic phase is about 0.7, being independent of the absolute iron concentration.

If, for example, after countercurrent stripping with 5.9 molar HCl the organic phase contains 0.022 mole/liter of iron, the chloride concentration will be 0.015 mole/liter. This chloride can be virtually completely stripped by a single washing step with water.

It is, of course, possible that the step of washing with water can be carried out by countercurrent contacting in such a fashion as to produce from the aqueous wash liquor a 5.9 molar hydrochloric acid which can be profitably utilized in the iron stripping stage. This is the maximum acid concentration which can be achieved in the given example since obviously the chloride in the organic phase was last in equilibrium with a 5.9 molar HCl in the countercurrent stripping of iron. To accomplish the washing step with recovery of a 5.9 molar HCl in the above example would require a phase ratio of organic to aqueous of 390:1. Since this high ratio is generally not very practical it is preferable to produce a more dilute hydrochloric acid in the washing operation.

The washing step also removes chloride which is present in the organic phase as dissolved hydrochloric acid. Table 3 gives data on chloride extraction from a 1 molar solution of di(2-ethylhexyl) hydrogen phosphate in kerosene after equilibrating this ion-exchange liquid in the absence of iron with hydrochloric acid of various concentrations. The data show that the HCl solubility in the ion-exchange liquid in equilibrium with aqueous acid increases with increasing acid concentration. However, the direct solubility of HCl in the pure ion-exchange liquid is low compared to the chloride pick-up in the organic phase in the presence of iron. For example, a 6 N HCl results in a chloride concentration of 0.0024 mole/liter in the pure ion-exchange liquid. In the presence of 1.22 grams/liter of iron in the organic phase in contact with an aqueous 5.9 N hydrochloric acid the chloride level increases to 0.022 mole/liter, and in the case of 10.5 grams/liter of iron the chloride level is 0.19 mole/liter.

TABLE 3

HCl solubility in ion-exchange liquid and extraction by water

| Hydrochloric acid, mole/liter: | Chloride found in organic phase by extraction with water, mole/liter |
|---|---|
| 2 | 0.0005 |
| 3 | 0.0008 |
| 4 | 0.0010 |
| 5 | 0.0014 |
| 6 | 0.0024 |
| 7 | 0.0048 |
| 8 | 0.013 |

In the step of removing the chloride from the ion-exchange liquid (contacting step D) the volume ratio of wash water to organic ion-exchange liquid will generally range from about 10-to-1 to about 1-to-100. As in the case of contacting step B, the lower ratios compatible with the attainment of the desired level of chloride removal are preferred. This washing step should generally be carried out at temperatures below about 100° C., and preferably within a temperature range between about 5 and 60° C.

Although the above description of the method of this invention has been given in terms of HCl strippnig, it is equally applicable to the use of $H_3PO_4$ or $HCl_4$ as a stripping agent to remove the iron from the ion-exchange liquid. Washing the organic phase in contacting Step D removes the phosphate as dilute $H_3PO_4$ or the perchlorate as dilute $HClO_4$.

In like manner if the aluminum-containing solution from which iron is to be removed in an aqueous aluminum sulfate solution, washing as in contacting Step B will remove the sulfate as dilute $H_2SO_4$.

By the method of this invention it is possible to effectively remove ferric iron (along with minor quantities of other metallic ions such as $Mg^{+2}$) from the aqueous solutions of aluminum salts by liquid-liquid contact with an organic ion-exchange liquid, strip the iron from the ion-exchange liquid and recycle it without transporting appreciable quantities of undesirable anions between the aluminum solution and the stripping agent.

It will thus be seen that the objects set forth above, among those made apparent from the preceding description are efficiently attained and, since certain changes may be made in carrying out the above method without departing from the scope of the invention, it is intended that all matter contained in the above description shall be interpreted as illustrative and not in a limiting sense.

We claim:
1. A method of removing ferric ions from an organic ion exchange liquid, consisting essentially of the steps of
   (a) contacting an organic, water-immiscible ion-exchange liquid, in which the ferric ion extractant comprises an alkyl-substituted phosphoric acid having the formula $HRR'PO_4$ wherein R is alkyl containing at least 8 carbon atoms and R′ is hydrogen or alkyl and in which the ferric ions are complexed with the anion of a strong mineral acid, with water thereby to remove water soluble anions and exchange said anions for hydroxyl ions;
   (b) contacting the resulting ion-exchange liquid with aqueous hydrochloric acid thereby to remove essentially all of said ferric ions as ferric chloride; and
   (c) contacting the resulting essentially iron-free ion-exchange liquid with water thereby to remove residual chloride ions.

2. A method of removing ferric ions from an organic ion-exchange liquid to which said ferric ions were transferred by contact with an aqueous aluminum nitrate solution, consisting essentially of the steps of
   (a) contacting with water an organic ion-exchange liquid, in which the ferric ion extractant comprises an alkyl-substitute phosphoric acid having the formula $HRR'PO_4$ wherein R is alkyl containing at least 8 carbon atoms and R′ is hydrogen or alkyl and in which the ferric ions are complexed with $NO_3^-$ ions, thereby to exchange said $NO_3^-$ ions in said ion-exchange liquid for $OH^-$ ions;
   (b) contacting the resulting ion-exchange liquid with aqueous hydrochloric acid to remove essentially all of the ferric ions as ferric chloride; and
   (c) contacting the resulting essentially iron-free ion-exchange liquid with water thereby to remove residual chloride ions from said organic ion-exchange liquid prior to recycling for contact with additional aqueous aluminum nitrate.

3. A method in accordance with claim 2 wherein the volume ratio of water to said organic ion-exchange liquid in step (a) ranges between about 1:100 to about 10:1.

4. A method in accordance with claim 2 wherein said contacting in step (a) is carried out at a temperature between about 5 and 100° C.

5. A method in accordance with claim 2 wherein the volume ratio of water to said essentially iron-free ion-exchange liquid in step (c) ranges between about 1:100 to about 10:1.

6. A method in accordance with claim 2 wherein said contacting in step (c) is carried out at a temperature between 5 and 100° C.

References Cited

UNITED STATES PATENTS

| | | | |
|---|---|---|---|
| 2,847,279 | 8/1958 | Tucker | 23—102 |
| 3,082,062 | 3/1963 | Preuss, Jr. | 23—92 |
| 3,193,381 | 7/1965 | George et al. | 23—123X |
| 3,240,561 | 3/1966 | Brown | 23—102 |
| 3,323,865 | 6/1967 | Michener, Jr., et al. | 23—123 |
| 3,331,662 | 7/1967 | Feller | 23—123 |

OTHER REFERENCES

Nachod, F. C., et al.; Ion Exchange Technology; Academic Press Inc.; New York; 1956, pp. 13–21.

EARL C. THOMAS, Primary Examiner

G. O. PETERS, Assistant Examiner

U.S. Cl. X.R.

23—50; 75—1.1